(12) United States Patent
Haag et al.

(10) Patent No.: US 9,212,633 B2
(45) Date of Patent: Dec. 15, 2015

(54) DEVICE FOR SELECTIVELY REGENERATING OR PERFORMING TANK LEAKAGE DIAGNOSIS OF A TANK VENTILATION SYSTEM

(75) Inventors: Silke Haag, Ilsfeld-Auenstein (DE); Helmut Denz, Stuttgart (DE); Andreas Pape, Oberriexingen (DE); Manfred Franz, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 13/976,174

(22) PCT Filed: Nov. 25, 2011

(86) PCT No.: PCT/EP2011/071017
§ 371 (c)(1),
(2), (4) Date: Oct. 2, 2013

(87) PCT Pub. No.: WO2012/089433
PCT Pub. Date: Jul. 5, 2012

(65) Prior Publication Data
US 2014/0013944 A1     Jan. 16, 2014

(30) Foreign Application Priority Data
Dec. 28, 2010   (DE) .......................... 10 2010 064 240

(51) Int. Cl.
| | |
|---|---|
| *F02M 25/08* | (2006.01) |
| *G01M 3/32* | (2006.01) |
| *G01M 3/02* | (2006.01) |

(52) U.S. Cl.
CPC ....... *F02M 25/0836* (2013.01); *F02M 25/0818* (2013.01); *G01M 3/025* (2013.01); *G01M 3/3263* (2013.01)

(58) Field of Classification Search
CPC .......... F02M 25/0818; F02M 25/0836; G01M 3/025; G01M 3/3263; B01D 53/04
USPC ......................... 95/146, 148; 96/144; 123/519
See application file for complete search history.

(56) References Cited

U.S. PATENT DOCUMENTS

| | | | |
|---|---|---|---|
| 6,182,642 B1 * | 2/2001 | Ohkuma ........................ | 123/520 |
| 6,983,739 B2 * | 1/2006 | Suzuki .......................... | 123/519 |

(Continued)

FOREIGN PATENT DOCUMENTS

| | | |
|---|---|---|
| DE | 43 12 720 A1 | 10/1994 |
| DE | 196 17 957 A1 | 11/1997 |

(Continued)

OTHER PUBLICATIONS

International Search Report corresponding to PCT Application No. PCT/EP2011/071017, mailed Jan. 31, 2012 (German and English language document) (7 pages).

*Primary Examiner* — Frank Lawrence
(74) *Attorney, Agent, or Firm* — Maginot, Moore & Beck LLP

(57) ABSTRACT

A device for selectively regenerating and performing tank leakage diagnosis of a tank ventilation system has a sorption filter and a pump. The sorption filter is configured to temporarily store fuel evaporating from a fuel tank. The pump is arranged at a fresh-air side of the sorption filter and is connected in fluid-conducting fashion to the sorption filter. The pump is configured to generate a fluid flow to regenerate the sorption filter.

18 Claims, 5 Drawing Sheets

(56) References Cited

U.S. PATENT DOCUMENTS

| | | | |
|---|---|---|---|
| 7,347,194 B2* | 3/2008 | Sato | 123/520 |
| 8,935,044 B2* | 1/2015 | Yang et al. | 701/34.4 |
| 2003/0213295 A1* | 11/2003 | Streib | 73/118.1 |
| 2004/0129066 A1* | 7/2004 | Schulz et al. | 73/118.1 |
| 2004/0173013 A1 | 9/2004 | Kobayashi et al. | |
| 2006/0283427 A1* | 12/2006 | Koyama et al. | 123/519 |
| 2007/0266998 A1* | 11/2007 | Kano et al. | 123/519 |
| 2013/0319378 A1* | 12/2013 | Haag et al. | 123/519 |

FOREIGN PATENT DOCUMENTS

| | | |
|---|---|---|
| DE | 197 35 549 A1 | 2/1999 |
| DE | 101 31 162 A1 | 1/2003 |
| WO | 02/081898 A1 | 10/2002 |

* cited by examiner

DEVICE FOR SELECTIVELY REGENERATING OR PERFORMING TANK LEAKAGE DIAGNOSIS OF A TANK VENTILATION SYSTEM

This application is a 35 U.S.C. §371 National Stage Application of PCT/EP2011/071017, filed on Nov. 25, 2011, which claims the benefit of priority to Serial No. DE 10 2010 064 240.1, filed on Dec. 28, 2010 in Germany, the disclosures of which are incorporated herein by reference in their entirety.

BACKGROUND

The disclosure relates to a device for selectively regenerating and performing a tank leakage diagnosis of a tank ventilation system, especially of a motor vehicle, having a sorption filter for temporarily storing fuel evaporating from a fuel tank, and having a pump arranged on the fresh-air side of the sorption filter. The disclosure further relates to a method for selectively regenerating and performing a tank leakage diagnosis of a tank ventilation system and to a motor vehicle having a device according to the disclosure.

In a fuel tank of a motor vehicle, volatile substances such as hydrocarbons in the main and smaller fractions of other volatile constituents evaporate as a function of the pressure and temperature conditions prevailing in the tank, and a composition of the fuel. For environmental protection and safety reasons, these substances must be collected and fed to the engine for combustion. For this purpose the volatile substances are usually adsorbed by means of an activated charcoal filter and temporarily stored. For regeneration or desorption of the activated charcoal filter, the substances are extracted by means of a fluid flow—usually fresh air—and are fed to an intake pipe on the inlet side of the internal combustion engine for combustion. Here the extraction is achieved by means of a vacuum, which occurs in the intake pipe due to throttling of the engine.

In the case of turbocharged engines, hybrid vehicles and other engines in which the engine is operated as dethrottled as possible in order to reduce the fuel consumption, there is the fundamental problem that conventional tank ventilation does not adequately regenerate the activated charcoal filter by means of a vacuum in the intake pipe.

Statutory legislation in some countries furthermore demands testing of the functional efficiency of tank ventilation systems in motor vehicles by on-board means, that is to say a so-called on-board diagnosis (OBD). As part of the on-board diagnosis any leaks must be detected, signaled and corresponding data made available to an on-board memory for an off-board diagnosis to be performed in a workshop.

DE 101 31 162 A1 discloses a device for the leak-testing of a tank ventilation system of a motor vehicle, having an electrically operated pressure source, which by means of a switching valve can be selectively connected to the tank ventilation system and to at least one reference orifice. Here, when the tank ventilation system or the reference orifice is subjected to an excess pressure or a vacuum, an electrical variable or an electrical reference variable of the pressure source is detected. The variables are compared with one another and the existence of a leak from the tank ventilation system is inferred from the result of the comparison.

DE 197 35 549 A1 further discloses a device for the diagnosis of a tank ventilation system of a vehicle having a tank and an adsorption filter, which is connected to the tank by way of a tank connecting line. For ventilation the tank ventilation system comprises a tank ventilation valve, which is connected to the adsorption filter by way of a valve line. By means of an on-board pressure source a switch alternately subjects the tank ventilation system and a reference leak to a pressure and in this way detects any leakage. A shut-off device, which is opened to carry a flow when both the reference leak and the tank ventilation system is subjected to pressure, is provided between the on-board pressure source and the switch. The shut-off device, however, is arranged so that regeneration air does not flow through it, except during the diagnostic sequences, resulting in low level of contamination and an increased service life of the shut-off device. During the regeneration of the adsorption filter, the tank ventilation valve is opened, so that atmospheric air is drawn through the adsorption filter due to a vacuum prevailing in an intake pipe, thereby drawing the hydrocarbons that have accumulated in the adsorption filter into the intake pipe and feeding them to an internal combustion engine.

The object of the disclosure is to provide a device which is cost-effective to produce and which firstly allows improved regeneration or desorption of the sorption filter and secondly affords an on-board diagnosis of any leakage in the tank ventilation system.

SUMMARY

According to the disclosure a device is created for selectively regenerating and performing a tank leakage diagnosis of a tank ventilation system, especially of a motor vehicle, having a sorption filter for temporarily storing fuel evaporating from a fuel tank, and having a pump, which is arranged on the fresh-air side of the sorption filter and which has a fluid-carrying connection to the sorption filter, wherein the pump is configured to generate a fluid flow for regenerating the sorption filter.

The tank ventilation system of a motor vehicle comprises a fuel tank, which preferably by way of a fuel tank connecting line has a fluid-carrying connection to a sorption filter, preferably an activated charcoal adsorption filter. This sorption filter temporarily stores volatile substances of the fuel, such as volatile hydrocarbons and other constituents, which are released due to the pressure and temperature conditions prevailing in the tank, especially when refueling the fuel tank.

The sorption filter preferably has a fluid-carrying connection by way of a purge line to an intake pipe connected to an internal combustion engine on the inlet side. A timed tank ventilation valve, which is suitable for selectively opening the purge line for purging, that is to say for regenerating the sorption filter at variable purging rates, or closing it, is preferably inserted in the purge line. Irrespective of the opening state of the tank ventilation valve, the fuel evaporating in the fuel tank is fed by way of the tank connecting line to the filter, where it is adsorbed and temporarily stored.

The sorption filter has one side facing the atmosphere, that is to say the fresh air. Arranged on this side facing the fresh air is a pump, which preferably has a fluid-carrying connection to the sorption filter by way of a switching valve.

With the switching valve in the rest position, it is possible, without activating the pump, for fresh air to be drawn through the filter by the vacuum in the intake pipe when the tank ventilation valve is opened, thereby desorbing the fuel adsorbed in the activated charcoal and feeding it to the engine for combustion. The pump is preferably configured so that at rest it has a low flow resistance.

If the vacuum in the intake pipe is insufficient for regeneration, the pump is activated by a control unit. The pump in this case receives a signal, in response to which, according to the disclosure, it delivers a purging fluid actively, that is to say without a vacuum in the intake pipe, through the sorption filter.

With or without a vacuum in the intake pipe, therefore, it is always possible to set a sufficiently large fluid flow in the direction of the intake pipe, so that the sorption filter, temporarily enriched with evaporated fuel, is regenerated by means of the purging fluid, that is to say in the main completely desorbed.

A cost-effective system for increasing the regeneration rate of the sorption filter is therefore created. The pump furnished according to the disclosure is a regenerating pump, which serves for pumping fresh air in the event of an insufficient vacuum in the intake pipe. The pump may be configured as a diaphragm pump, for example, or a vane pump. The additional fresh air pumping preferably occurs only if the sorption filter is heavily laden with volatile fuel constituents. Power consumption, associated with the pumping, by the device according to the disclosure thereby occurs only when needed—the increase in regeneration rates is therefore demand-oriented.

The fluid flow generated by the pump and a closed tank ventilation valve can furthermore serve to produce a specific pressure increase in the tank, thereby reducing evaporation of the fuel. Also, during the active regeneration of the sorption filter, that is to say with the tank ventilation valve opened, a specific pressure is built up in the fuel tank, so that degassing of the fuel is likewise reduced, especially in uphill driving.

According to an advantageous development of the device according to the disclosure the pump is configured to generate a fluid flow for performing a tank leakage diagnosis.

In the case of such a development the tank ventilation valve is closed. The pump configured according to the disclosure receives a signal from a control unit causing the pump to deliver fresh air, preferably when the engine and the vehicle are at a standstill. In an area between the pump, the tank ventilation valve and the fuel tank an excess pressure is generated in the tank ventilation system due to the fluid flow produced. As part of an on-board diagnosis any leakage can be detected from pressure values determined by means of a tank pressure sensor and from a certain pressure profile, which occurs during pumping up and subsequently with the pump switched off and a switching valve in the closed position. A precise leakage diagnosis is therefore created on the excess pressure principle when the vehicle is stationary, which affords a high selectivity and feasibility in any driving cycle.

The pump configured according to the disclosure allows a rapid build-up of pressure to a specific reference level, reducing the length of time needed for a tank leakage diagnosis.

According to a further advantageous development of the device according to the disclosure the pump has a fluid-carrying connection to the sorption filter by way of a switching valve, in particular by way of a two-way switching valve.

The pump is configured, when the switching valve is in a first switch position in which a fluid connection is opened between the pump and the sorption filter, to generate a fluid flow for performing a tank leakage diagnosis or for regenerating the sorption filter. With the switching valve in a second switch position the fluid connection to the sorption filter is closed when the pump is switched off.

The two-way valve is preferably a bistable solenoid-actuated switching valve with position feedback, which is switched into the first or second switch position by brief actuating pulses. This minimizes the power consumption of the valve, which leads to improved efficiency and reduced fuel consumption.

The two-way valve on the one hand assumes the first switch position when the fuel tank is being refueled or the sorption filter is being regenerated by way of an intake pipe vacuum. For this purpose the pump configured according to the disclosure is switched off. When refueling, therefore, pressure equalization with the surroundings can take place by way of the opened switching valve. On the other hand the two-way valve also assumes the first switch position when the sorption filter is being regenerated or an excess pressure is built up for performing a tank leakage diagnosis. In this case the pump is switched on and actively delivers fluid through the sorption filter.

The two-way valve assumes the second switch position, that is to say the fresh air inlet to the sorption filter is closed fluid-tight when the tank leakage diagnosis is being performed by means of a detection of pressure values.

According to a further advantageous development of the device according to the disclosure the switching valve is a three-way valve, which in a first switch position closes a fluid connection between the pump and the sorption filter on the pump side and opens a connection between the sorption filter and a bypass line to the fresh air filter; in a second switch position opens a fluid connection between the pump and the sorption filter and closes the connection to the bypass line; and in a third switch position closes the fluid connection to the sorption filter on the sorption filter side.

The three-way valve is preferably a tristable solenoid-actuated switching valve with position feedback, which is switched into the first, second or third switch position by brief actuating pulses. This minimizes the power consumption of the valve, which leads to improved efficiency and reduced fuel consumption.

In the first switch position of the three-way valve the pump is switched off and a fluid-carrying connection is established between the sorption filter and a bypass line, which has a fluid-carrying connection to the atmosphere. This switch position affords a facility for pressure equalization with the surroundings having a low flow resistance during refueling of the fuel tank, or it provides a conventional regeneration of the sorption filter by way of an intake pipe vacuum.

The three-way valve assumes the second switch position when the pump is switched on and generates a fluid flow for regenerating the sorption filter or for performing a tank leakage diagnosis.

The third switch position pertains, that is to say the fresh air inlet to the sorption filter is closed fluid-tight when pressure values are being determined for performing the tank leakage diagnosis.

According to a further advantageous development of the device according to the disclosure a pressure equalization line having a pressure-limiting valve is connected in parallel with the switching valve and has a fluid-carrying connection to the atmosphere.

The pressure equalization line forms a fluid-carrying connection connecting the sorption filter to the atmosphere, bypassing the switching valve and the pump. A pressure-limiting valve, which at a predefined activation pressure opens in the direction of the atmosphere, is inserted in the pressure equalization line. In this way fluid, which is forced out of the fuel tank during refueling, for example, and which generates too high a pressure in the tank due to the flow resistance of the pump or the switching valve, can additionally escape by way of the pressure equalization line having a low flow resistance. This serves to ensure that an excessive pressure, which might cause the fuel nozzle to shut off, is not built up in the tank during refueling. In the event of an excessive pump delivery rate or a pressure increase in the tank, it also ensures that no fuel vapor gets out through a pressure relief valve on the tank but only reaches the outside once filtered via the adsorption filter.

According to a further advantageous development of the device according to the disclosure the pump is embodied as a two-stage pump with variable delivery rate.

Here the pump is preferably configured in conjunction with a pump flow meter and a reference bypass.

Such a development makes it possible, on the one hand, to boost the fluid flow rate of the pump and to further increase the regeneration rate. On the other hand it is possible to perform a minor leakage diagnosis with great accuracy. For this purpose the pump, configured with a two-stage delivery rate, can provide a relatively low volumetric flow, which is balanced, for example, with a reference leak connected in parallel with the switching valve.

The increased delivery rate of the pump may also serve to reduce the diagnostic time in that it first pumps with a larger delivery and for fine adjustment with a smaller delivery— with a so-called "diagnostic delivery". For this purpose test switchings may if necessary be performed at specific time intervals during the pumping-up phase of the tank.

According to a further advantageous development of the device according to the disclosure actuation of the pump may be timed by a control unit, thereby producing the variable delivery rate.

A timed actuation may also serve to increase the fluid flow rate of the pump and to increase the regeneration rate. Furthermore, here too a minor leakage diagnosis can be performed with great accuracy. By means of the timing it is possible to provide a smaller volumetric flow, which is balanced, for example with a reference leak connected in parallel with the switching valve.

According to a further advantageous development of the device according to the disclosure the variable delivery rate is produced by means of an independently actuated auxiliary pump having a higher delivery rate, by way of a non-return valve in parallel with the pump.

Using an auxiliary pump makes it possible to increase the regeneration rate. The auxiliary pump can be controlled by way of a separate current path independently of the pump configured according to the disclosure. It may be configured as a modular, separately hose-connected or flange-mounted auxiliary component, so that the auxiliary pump comes into use only in instances where high regeneration requirements exist.

In addition, with the auxiliary pump switched off, a minor leakage diagnosis can be performed with great accuracy according to the aforementioned procedure by way of a basic pump having a smaller delivery rate.

A method for selectively regenerating and performing a tank leakage diagnosis of a tank ventilation system is furthermore created. The method comprises the following steps:
provision of a sorption filter for temporarily storing fuel evaporating from a fuel tank, and a pump which is arranged on the fresh-air side of the sorption filter and which has a fluid-carrying connection to the sorption filter by way of a switching valve,
switching the switching valve into a switch position in which a fluid connection between the pump and the sorption filter is opened, and
selectively actuating the pump for actively delivering a fluid flow for regenerating the sorption filter or for performing a tank leakage diagnosis.

According to the disclosure a method is created, which serves selectively for increasing the regeneration rate of a sorption filter and performing a tank leakage diagnosis of a tank ventilation system. For this purpose the sorption filter is connected to a pump by way of a switching valve. The switching valve and the pump are preferably operated by a control unit.

For generating a fluid flow, which regenerates the sorption filter, the switching valve is switched into an opening direction. The pump is set in such a way that it delivers a quantity of fluid through the sorption filter which is sufficiently large to desorb the accumulated fuel constituents and to feed them by way of an opened tank ventilation valve to an intake pipe on the inlet side of the internal combustion engine for combustion.

For performing a tank ventilation diagnosis the switching valve is likewise switched into an opening direction. The tank ventilation valve on the other hand is closed and an excess pressure is built up in the tank ventilation system. Any leakage can be inferred from the pressure profiles detected during pumping and subsequently with the switching valve closed.

In addition a motor vehicle is created having a device according to the disclosure for selectively regenerating and performing a tank leakage diagnosis of a tank ventilation system.

The motor vehicle according to the disclosure is advantageously equipped with a device according to the features explained above. Such a device ensures that firstly an adequate regeneration of the sorption filter is provided in all operating states. Secondly an on-board tank leakage diagnosis can be performed cost-effectively and easily.

The motor vehicle according to the disclosure may be equipped, in particular, with a turbocharged engine, preferably with a downsize turbocharged engine, which for a smaller displacement ensures an engine power output comparable to naturally aspirated engines having a larger displacement. The pump, which is capable of actively delivering fluid through the sorption filter for regenerating the sorption filter, overcomes the problem that turbocharged engines have operating states where there is an insufficient vacuum in the intake pipe, in which the sorption filter is often not sufficiently regenerated. If the pump actively delivers purging fluid, such as fresh air, in the direction of the internal combustion engine, a sufficiently strong fluid flow is provided, which fully regenerates the sorption filter in all engine operating states, that is to say the volatile substances of the fuel are desorbed even in the absence of a vacuum in the intake pipe and are fed to the engine for combustion. The same also applies to engines having valve lift control, which are operated largely dethrottled and without a substantial intake pipe vacuum. If, on the other hand, the pump generates an excess pressure in the tank ventilation system, it is possible to perform a reliable diagnosis with regard to any leakage.

BRIEF DESCRIPTION OF THE DRAWINGS

Exemplary embodiments of the solution according to the disclosure are explained in more detail below with reference to the drawings attached, of which.

DETAILED DESCRIPTION

Figure 1:
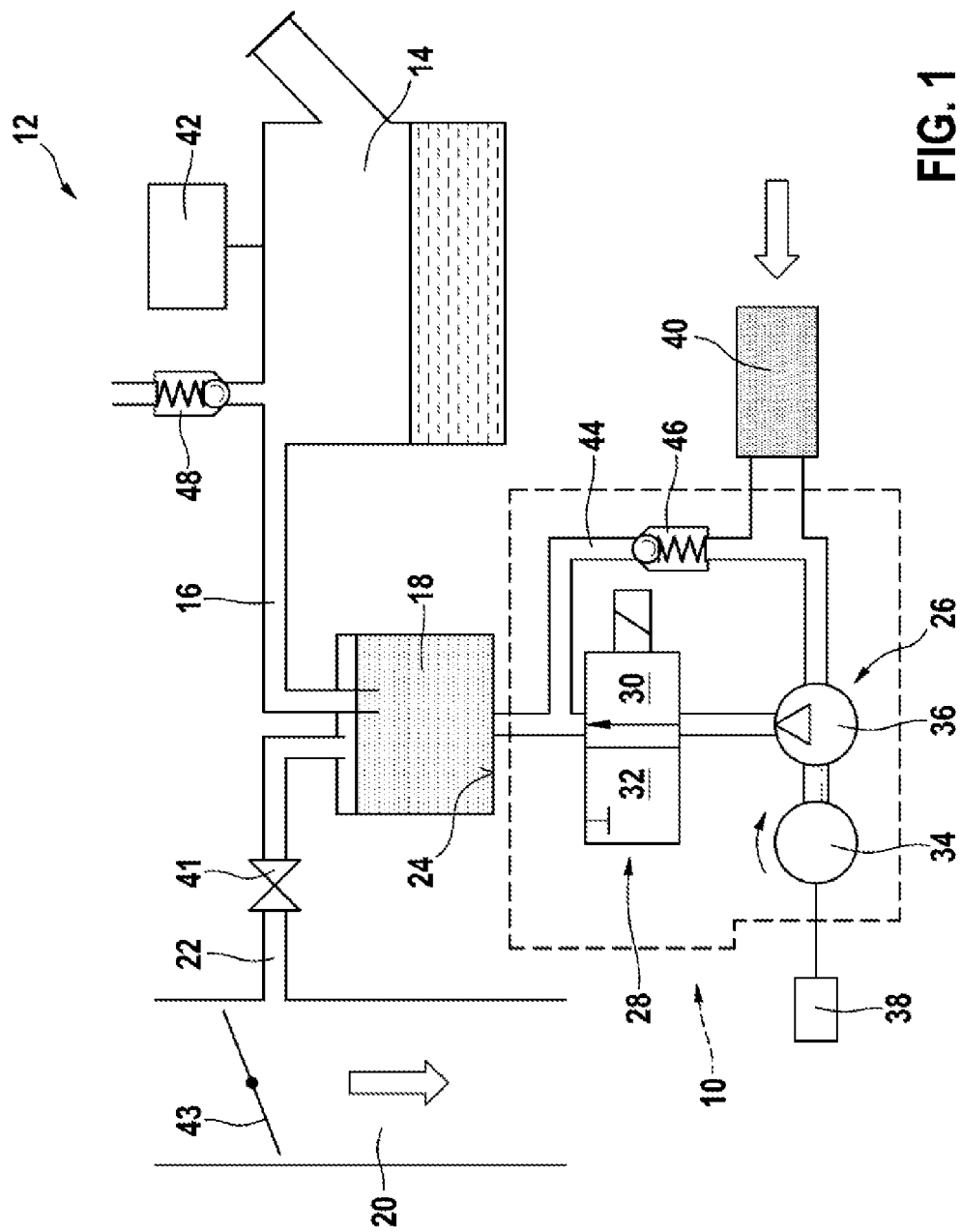
FIG. 1 shows a schematic representation of a tank ventilation system with a first exemplary embodiment of a device according to the disclosure having a two-way valve.

FIG. 1 illustrates a device 10 for regenerating and performing a tank leakage diagnosis of a tank ventilation system 12. The tank ventilation system 12 comprises a fuel tank 14, which by way of a tank connecting line 16 has a fluid-carrying connection to a sorption filter 18. The sorption filter 18 is embodied as an activated charcoal filter, which is capable of temporarily storing volatile constituents of evaporating fuel by adsorption and desorption. The sorption filter 18 furthermore has a fluid-carrying connection by way of a purge line 22 to an intake pipe 20 connected to the inlet side of an internal combustion engine. Via the tank connecting line 16, volatile constituents of the fuel, such as hydrocarbons, can therefore be led from the fuel tank 14 into the sorption filter 18, stored and from there can be controllably fed by way of a timed tank ventilation valve 41 and the purge line 22 to the engine for combustion.

The sorption filter 18 has a side 24, which faces the atmosphere, that is to say the fresh air. Arranged on this side 24 facing the fresh air is the device 10, which comprises a pump 26, which has a fluid-carrying connection to the sorption filter 18 by way of a switching valve 28. Here the switching valve 28 is configured as a solenoid-actuated two-way valve, which can be switched into a first switch position 30 and a second switch position 32. The fluid-carrying connection between the pump 26 and the sorption filter 18 is opened in the first switch position 30 and closed in the second switch position 32.

The pump 26 may simply be switched on or off, or alternatively it may be electrically time-controlled, and comprises a motor 34 and a compressor 36. A control unit 38 coupled to the motor 34 switches the pump 26 into an on or off operating state as required or regulates a rate of flow through the pump 26. When the pump 26 is switched on, the motor 34 drives the compressor 36, which draws in a purging fluid, in this case fresh air, by way of an inlet provided with a fresh air filter 40, compresses it and delivers it into the sorption filter 18 by way of the opened switching valve 28 in the first switch position 30. A fluid flow is actively generated here.

According to the disclosure the fluid flow can be selectively used for regenerating the sorption filter 18 and for performing a tank leakage diagnosis. For this purpose the fluid flow can be optimally and variably adjusted by the control unit 38, thereby preventing unnecessary power consumption of the pump 26 and improving the efficiency.

When regenerating the sorption filter 18, the tank ventilation valve 41 inserted in the purge line 22 is opened and the fresh air delivered through the sorption filter 18 desorbs the evaporated fuel constituents that have been temporarily stored. The air enriched with the evaporated fuel is fed to the intake pipe 20 downstream of a throttle valve 43 for combustion in the engine.

In the fully opened position the tank ventilation valve 41 provides a relatively large opening cross section with a low flow resistance. A fall in pressure at the tank ventilation valve 41 at maximum fluid flow and with a pressure building up in the tank 14 is thereby minimized. The tank 14 therefore need not have any exceptional overpressure strength and is inexpensively made from plastic.

Switching the pump 26 on ensures that regeneration of the activated charcoal filter is always adequate, even in the prolonged absence of a sufficient intake pipe vacuum, as is the case in prolonged uphill driving with the throttle valve wide open or in engines with valve lift control and hence extensively dethrottled operation.

If, in normal driving of the motor vehicle and in regeneration of the sorption filter 18, a specific pressure is set by means of the pump 26, this has an advantageous effect on degassing of the fuel in the fuel tank 14, particularly during uphill driving. Owing to the increased pressure in the tank 14, less degassing of the fuel occurs, thereby reducing the risk of an escape of volatile fuel constituents in the sorption filter 18.

Whilst the tank leakage diagnosis is being performed, the switching valve 28 is first opened (first switch position 30). The tank ventilation valve 41 on the other hand is closed and seals off the tank ventilation system 12 fluid-tight in the direction of the intake pipe 20. The pump 26 actively delivers fresh air into the tank ventilation system 12 by way of the opened switching valve 28 and generates an excess pressure. When a specific pressure is set, the pump 26 is switched off and the switching valve 28 is switched from the first switch position 30 into the second switch position 32, thereby closing the inlet to the sorption filter 18. A pressure sensor 42 or a tank pressure switch arranged in the fuel tank 14 registers pressure values over a specific time profile, from which values it is possible to detect any leakage in the tank ventilation system 12.

During normal driving of the motor vehicle, an approximate detection of the leakage is undertaken through the excess pressure generated. When, with the motor vehicle shut off, on the other hand, the pressure profiles are not upset by movement of the fuel in the tank, causing increased degassing, a precise leakage detection ensues through the active delivery of fluid by means of the pump 26. In approximate leakage detection it is furthermore possible to detect whether a tank cap has been fitted fluid-tight to a tank filler-neck.

In addition, the device 10 according to the disclosure also allows regeneration of the sorption filter 18 in partial load operation of the engine via the excess pressure generated with the throttle valve 43 at least partially closed. For this purpose the pump 26 is switched by the control unit 38 into an inoperative operating state and the switching valve 28 and the tank ventilation valve 41 are switched to an open passage state. The vacuum prevailing in the intake pipe 20 causes atmospheric air to be drawn through the sorption filter 18 by way of the fresh air filter 40 and the pump 26, which when idle preferably has a low flow resistance.

From the tank pressure measured by means of the tank pressure sensor 42 and the measured or modeled intake pipe vacuum it is possible to determine the approximate pressure differential over the tank ventilation valve 41, and from this it is possible to calculate the required timing ratio for the required flow rate.

In addition, a pressure equalization line 44 with an inserted pressure-limiting valve 46 is arranged in parallel with the switching valve 28. The pressure equalization line 44 forms a fluid-carrying connection between the sorption filter 18 and the fresh air filter 40, when the pressure in the tank 14 becomes too great, and in this way ensures a filtered pressure equalization between the fuel tank 14 and the atmosphere. Besides switching of the two-way valve 28, it is therefore ensured, where necessary, that during refueling of the fuel tank 14 a flow resistance on the fresh-air side 24 of the sorption filter 18, which might lead to a pressure increase in the tank 14 and to shutting off of the fuel-pump nozzle, is as low as possible.

The pressure limiting valve 46 inserted in the pressure equalization line 44 opens in the direction of the atmosphere in the event of an activation pressure that is below an admissible tank pressure, in this case, for example, at approximately 50 hPa. The activation pressure of the pressure limiting valve 46 is in particular lower than the activation pressure of a tank pressure limiting valve 48 arranged in the fuel tank 14, which is approximately 150 hPa. In operation of the vehicle, a pressure of up to 50 hPa, which leads to a lower evaporation rate of the fuel in the tank 14, can therefore build up in the tank ventilation system 12. If the pressure value of approximately 50 hPa is exceeded, an equalization of the gas pressure ensues by way of the pressure equalization line 44.

In instances where the delivery rate of the pump 26 is too high or the pressure in the tank 14 is excessive, it is therefore ensured through heavy degassing that no fuel vapor gets out through the tank pressure limiting valve 48, but filtered fluid gets out only via the activated charcoal filter 18.

Figure 2:
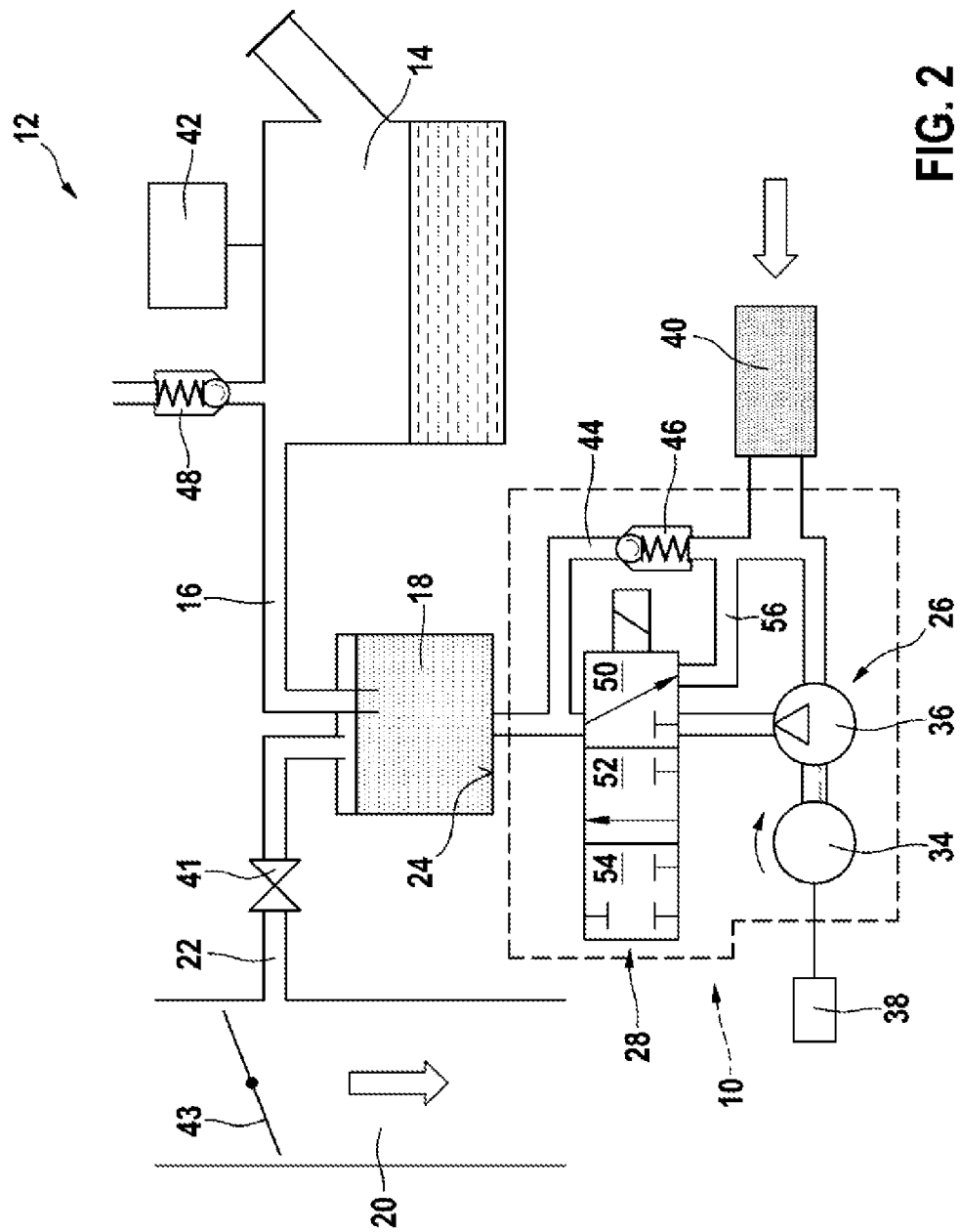
FIG. 2 shows a schematic representation of a tank ventilation system with a second exemplary embodiment of a device according to the disclosure having a three-way valve.

FIG. 2 shows the tank ventilation system 12 with the device 10 according to FIG. 1, in which the switching valve 28 is configured as a solenoid-actuated three-way valve 28.

The three-way valve 28 can be switched into a first switch position 50, into a second switch position 52 and into a third switch position 54. In the first switch position 50 the fluid-carrying connection between the pump 26 and the sorption filter 18 is closed on the pump-side and a fluid-carrying connection with a low flow resistance is opened between the sorption filter 18 and a bypass line 56. The bypass line 56 forms a fluid-carrying connection between the sorption filter 18 and the fresh air filter 40 and thus ensures a pressure equalization between the tank ventilation system 12 and the atmosphere. When the switching valve 28 is situated in the first switch position 50, the pump 26 is switched off. In this state a refueling of the fuel tank 14 or a regeneration of the sorption filter 18 can ensue by means of the vacuum generated by the intake pipe 20. One advantage is that in both cases the flow resistance is low.

In the second switch position 52 the fluid-carrying connection between the pump 26 and the sorption filter 18 is opened and the connection to the bypass line 56 is closed. In this state the pump 26 is switched on. The pump 26 actively delivers fluid through the sorption filter 18 for regenerating the latter or in order to generate an excess pressure for performing a tank leakage diagnosis.

In the third switch position 54 the fluid-carrying connection between the sorption filter 18 and the pump 26 and the bypass line 56 is closed on the sorption filter side. The tank ventilation system 12 is therefore closed fluid-tight when the tank ventilation valve 41 is closed and a tank leakage diagnosis can be performed by detecting pressure values with the aid of the pressure sensor 42.

Figure 3:
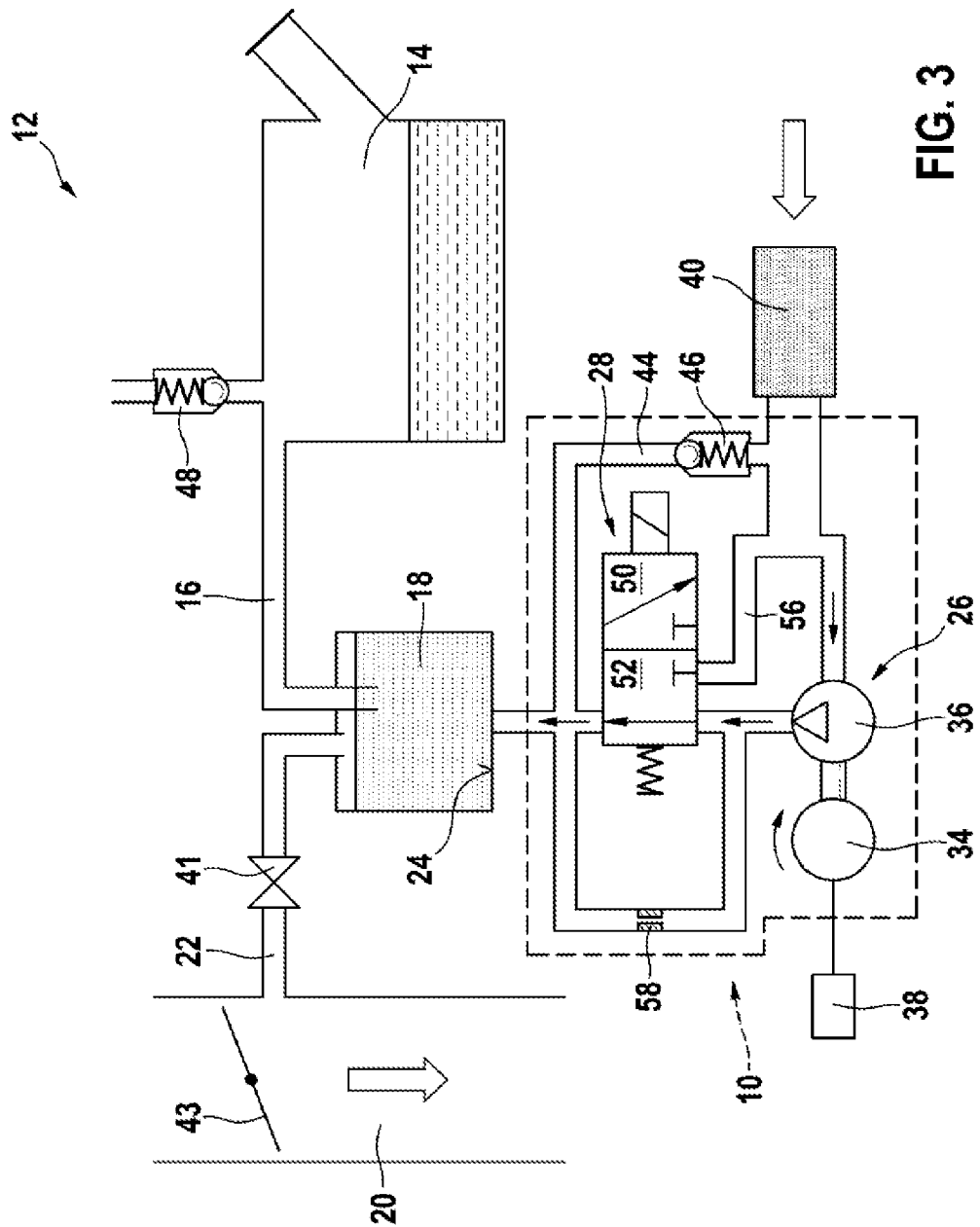
FIG. 3 shows a schematic representation of a tank ventilation system with a third exemplary embodiment of a device according to the disclosure having a reference leak.
Figure 4:
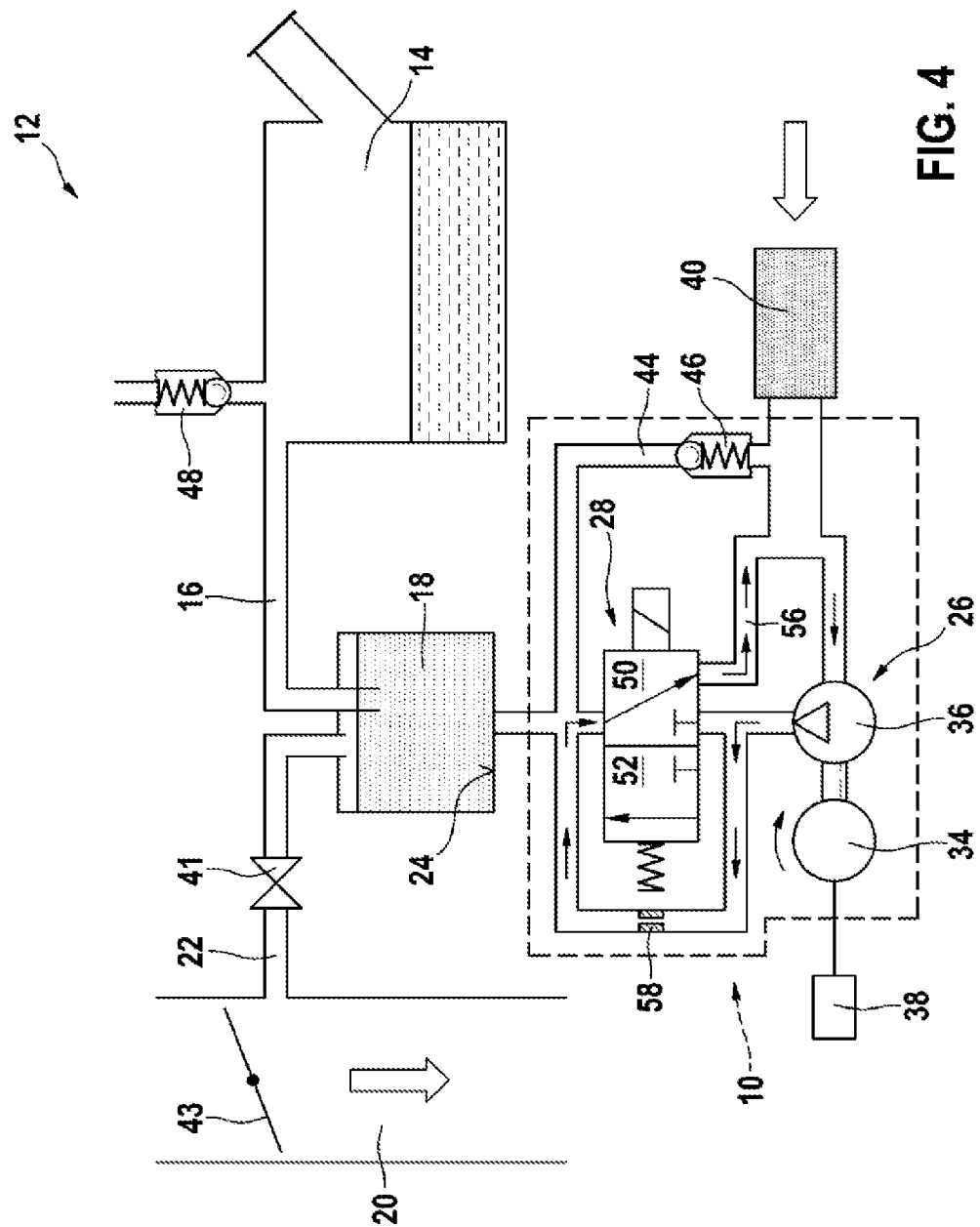
FIG. 4 shows a schematic representation of the tank ventilation system according to FIG. 3 having a valve position, which is set for refueling of the fuel tank.

FIGS. 3 and 4 show a tank ventilation system 12 according to FIG. 2 having a device 10 for selective regeneration and performing a tank leakage diagnosis. The system 12 does not comprise a pressure sensor 42, however, but a reference leak 58, which is connected in parallel with the two-way valve 28, together with a flow measuring device for registering the pump flow.

FIG. 3 shows the two-way valve 28 in the second switch position 52, that is to say a fluid-carrying connection between the pump 26 and the sorption filter 18 is opened.

FIG. 4 on the other hand illustrates the two-way valve 28 in the first switch position 50, in which a direct fluid-carrying connection between the pump 26 and the sorption filter 18 is closed on the pump side, and a fluid-carrying connection between the sorption filter 18 and the air filter 40 on the fresh air side is opened.

When the two-way valve 28 assumes the second switch position 52 according to FIG. 3 and the pump 26 is switched on, the pump 26 actively generates a fluid flow for regenerating the sorption filter 18 or for performing a tank leakage diagnosis according to the method of pump flow measurement discussed above.

The reference leak 58 connected in parallel with the two-way valve 28 serves to increase the accuracy in the minor leakage diagnosis. For this purpose the reference leak 58 is pressurized by means of the pump 26 when the three-way valve 28 is in the first switch position, in which the fluid connection is closed on the pump side (cf. FIG. 4). In this case fresh air is delivered through the pump 26 and the reference leak 58 and returned through the valve 28. This is a known method serving for precisely determining the pump flow in the event of a defined minor leak.

A comparison of the power consumption of the pump 26 in the second switch position 52, for the purpose of performing a tank leakage diagnosis, and in the first switch position 50, in which the reference leak 58 is pressurized, allows any minor leakage to be inferred.

In order to provide a smaller fluid flow that may be required for minor leakage diagnosis, the pump 26 in the present embodiment is configured as a two-stage pump 26. Alternatively, actuation of the pump 26 may be timed, for example, and the flow measured at a defined small duty factor.

Figure 5:
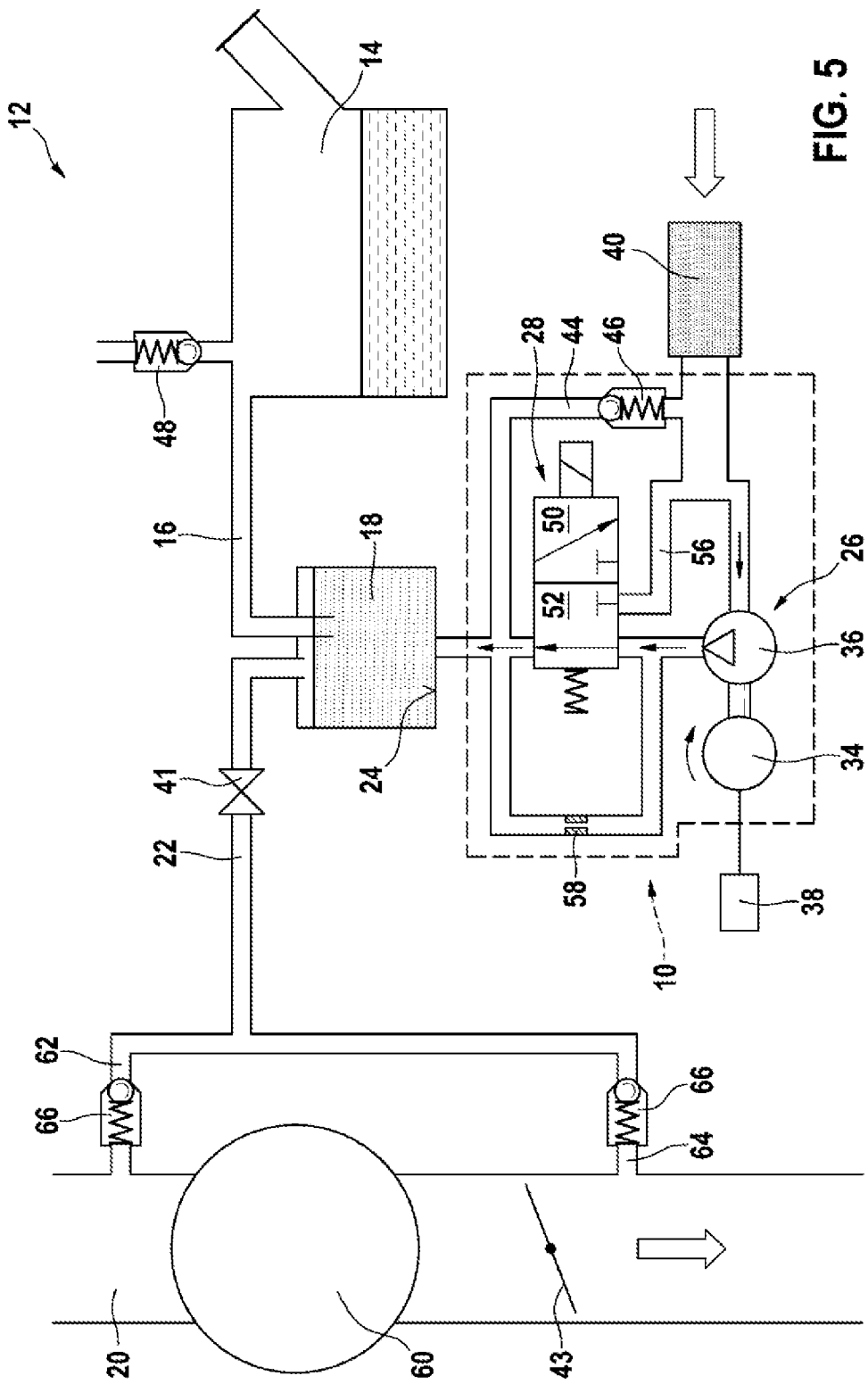
FIG. 5 shows a schematic representation of a tank ventilation system according to FIG. 3, which is assigned to a turbocharged engine.

FIG. 5 shows the device 10 for selectively regenerating and performing a tank leakage diagnosis of the tank ventilation system 12 according to FIG. 3 for a turbocharged engine having a turbocharger unit 60.

The device 10 overcomes the problem that turbocharged engines more rarely have operating states with a sufficient vacuum in the intake pipe 20, so that the sorption filter 18 is often not adequately regenerated.

In a manner familiar in turbocharged engines, the purge line 22 of the tank ventilation system 12 has a fluid carrying connection to the intake pipe 20 by way of a first line 62 to an introduction point on the inlet side of the turbocharger unit 60 and by way of a second line 64 to an introduction point on the outlet side of the turbocharger unit 60.

Both introduction points are provided with non-return valves 66, so as to avoid a bypass flow. In conventional systems regeneration is performed by way of the second line 64 when there is an adequate intake pipe vacuum, and otherwise by way of the first line 62. Due to a venturi-effect at the introduction point at the valve 66, a certain vacuum is generated, which does not lead, however, to a sufficient increase in regeneration.

When a degree of saturation of the regenerating flow is detected and the intake pipe pressure is insufficient, the device 10 switches on the pump 26, thereby increasing the regeneration rate by way of the first introduction point, as described above.

The arrangement for turbocharged engines according to FIG. 5 is equally feasible for the tank ventilation systems 12 according to FIGS. 1 and 2.

The invention claimed is:

1. A device for selectively regenerating and performing a tank leakage diagnosis of a tank ventilation system, comprising:
   a sorption filter configured to temporarily store fuel evaporating from a fuel tank; and
   a pump arranged on a fresh-air side of the sorption filter and having a fluid-carrying connection and a switching valve that fluidly connect the pump to the sorption filter, the pump configured to generate a fluid flow to regenerate the sorption filter, the switching valve configured as a two-way valve or a three-way valve, the switching valve configured to close a fluid connection between the pump and the sorption filter when the switching valve is in a first position such that the tank ventilation system is closed fluid tight.

2. A device for selectively regenerating and performing a tank leakage diagnosis of a tank ventilation system, comprising:
- a sorption filter configured to temporarily store fuel evaporating from a fuel tank; and
- a pump arranged on a fresh-air side of the sorption filter and having a fluid-carrying connection to the sorption filter, the pump configured to generate a fluid flow to regenerate the sorption filter,
- wherein the pump has a fluid-carrying connection to the sorption filter via a switching valve;
- wherein the switching valve is a three-way valve,
- wherein the switching valve is configured to close a fluid connection between the pump and the sorption filter on a pump side and open a connection between the sorption filter and a bypass line when the switching valve is in a first switch position,
- wherein the switching valve is configured to open the fluid connection between the pump and the sorption filter and close the connection to the bypass line when the switching valve is in a second switch position, and
- wherein the switching valve is configured to close the fluid connection to the sorption filter on a sorption filter side when the switching valve is in a third switch position.

3. The device as claimed in claim 2, wherein the pump is configured to generate a fluid flow to perform a tank leakage diagnosis.

4. The device as claimed in claim 2, wherein the pump is a two-stage pump with a variable delivery rate.

5. The device as claimed in claim 4, wherein actuation of the pump by a control unit is timed to produce the variable delivery rate.

6. The device as claimed in claim 2, further comprising a pressure equalization line having a pressure-limiting valve, the pressure equalization line connected in parallel with the switching valve and having a fluid-carrying connection to atmosphere.

7. A device for selectively regenerating and performing a tank leakage diagnosis of a tank ventilation system, comprising:
- a sorption filter configured to temporarily store fuel evaporating from a fuel tank;
- a pump arranged on a fresh-air side of the sorption filter and having a fluid-carrying connection and a switching valve that fluidly connect the pump to the sorption filter, the pump configured to generate a fluid flow to regenerate the sorption filter; and
- a pressure equalization line having a pressure-limiting valve, the pressure equalization line connected in parallel with the switching valve and having a fluid-carrying connection to atmosphere.

8. The device as claimed in claim 7, wherein the pump is configured to generate a fluid flow to perform a tank leakage diagnosis.

9. The device as claimed in claim 7, wherein the switching valve is a two-way valve, configured to open a fluid connection between the pump and the sorption filter when the switching valve is in a first switch position and configured to close the fluid connection between the pump and the sorption filter when the switching valve is in a second switch position.

10. The device as claimed in claim 7, wherein the pump is a two-stage pump with a variable delivery rate.

11. The device as claimed in claim 10, wherein actuation of the pump by a control unit is timed to produce the variable delivery rate.

12. The device as claimed in claim 10, wherein the variable delivery rate is produced by an independently actuated auxiliary pump having a higher delivery rate by way of a non-return valve in parallel with the pump.

13. A device for selectively regenerating and performing a tank leakage diagnosis of a tank ventilation system, comprising:
- a sorption filter configured to temporarily store fuel evaporating from a fuel tank; and
- a pump arranged on a fresh-air side of the sorption filter and having a fluid-carrying connection to the sorption filter, the pump configured to generate a fluid flow to regenerate the sorption filter,
- wherein the pump is a two-stage pump with a variable delivery rate; and
- wherein the variable delivery rate is produced by an independently actuated auxiliary pump having a higher delivery rate by way of a non-return valve in parallel with the pump.

14. The device as claimed in claim 13, wherein the pump is configured to generate a fluid flow to perform a tank leakage diagnosis.

15. The device as claimed in claim 13, wherein the pump has a fluid-carrying connection to the sorption filter via a switching valve.

16. The device as claimed in claim 15, wherein the switching valve is a two-way valve, configured to open a fluid connection between the pump and the sorption filter when the switching valve is in a first switch position and configured to close the fluid connection between the pump and the sorption filter when the switching valve is in a second switch position.

17. The device as claimed in claim 13, further comprising a pressure equalization line having a pressure-limiting valve, the pressure equalization line connected in parallel with the switching valve and having a fluid-carrying connection to atmosphere.

18. The device as claimed in claim 17, wherein actuation of the pump by a control unit is timed to produce the variable delivery rate.

* * * * *